United States Patent
Schwartzkopff

(10) Patent No.: US 10,072,595 B2
(45) Date of Patent: Sep. 11, 2018

(54) METHOD AND DEVICE FOR ASCERTAINING A GAS-MASS FLOW IN A COMBUSTION ENGINE

(71) Applicant: Robert Bosch GmbH, Stuttgart (DE)

(72) Inventor: Thomas Schwartzkopff, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/363,245

(22) Filed: Nov. 29, 2016

(65) Prior Publication Data

US 2017/0167422 A1 Jun. 15, 2017

(30) Foreign Application Priority Data

Dec. 15, 2015 (DE) .................. 10 2015 225 250

(51) Int. Cl.
*F02D 41/18* (2006.01)
*G01F 1/696* (2006.01)
(Continued)

(52) U.S. Cl.
CPC .......... *F02D 41/18* (2013.01); *F02D 41/1444* (2013.01); *F02D 41/28* (2013.01); *G01F 1/6965* (2013.01); *F02D 2041/288* (2013.01); *F02D 2200/0402* (2013.01); *F02D 2200/0414* (2013.01)

(58) Field of Classification Search
CPC ...... F02D 41/18; F02D 41/28; F02D 41/1444; F02D 41/187; F02D 41/2474; F02D 41/2477; F02D 41/2438; F02D 41/144; F02D 41/1445; F02D 41/1438; F02D 2041/288; F02D 2041/1432; F02D 2041/1411; F02D 2041/1406; F02D 2041/281; F02D 2041/286; F02D 2200/0402; F02D 2200/0414; G01F 1/6965; G01F 1/72; G01F 1/696
See application file for complete search history.

(56) References Cited

U.S. PATENT DOCUMENTS 6,062,204 A * 5/2000 Cullen .................. F02D 41/005
                                                    123/406.12
6,272,423 B1 * 8/2001 Rekewitz ................ F02D 41/18
                                                    123/488
(Continued)

FOREIGN PATENT DOCUMENTS

DE        19620435 C1    1/1998
DE    102009056796 A1    6/2011
(Continued)

*Primary Examiner* — Lindsay Low
*Assistant Examiner* — George Jin
(74) *Attorney, Agent, or Firm* — Norton Rose Fulbright US LLP; Gerard Messina

(57) ABSTRACT

A method for ascertaining a mean value of a gas-mass flow in a combustion engine. The method includes measuring a gas-mass flow impinged upon by a pulsation, smoothing a sensor signal obtained by the measurement, applying a correction quantity to the smoothed sensor signal in order to obtain the mean value of the gas-mass flow, and ascertaining the correction quantity as a function of the operating state of the combustion engine with the aid of a data-based, non-parametric function model.

14 Claims, 2 Drawing Sheets

(51) Int. Cl.
    *F02D 41/28*    (2006.01)
    *F02D 41/14*    (2006.01)

(56) References Cited

U.S. PATENT DOCUMENTS

| | | | | |
|---|---|---|---|---|
| 6,556,929 | B1 * | 4/2003 | Kleinhans | F02D 41/187 |
| | | | | 702/45 |
| 9,805,313 | B2 * | 10/2017 | Nguyen-Tuong | G06N 99/005 |
| 2009/0132145 | A1 * | 5/2009 | Angeby | F02D 35/02 |
| | | | | 701/102 |
| 2013/0110749 | A1 * | 5/2013 | Streichert | F02D 41/1401 |
| | | | | 706/12 |
| 2014/0309972 | A1 * | 10/2014 | Fischer | G06F 17/5009 |
| | | | | 703/2 |
| 2016/0298537 | A1 * | 10/2016 | Matthews | F02D 41/221 |

FOREIGN PATENT DOCUMENTS

| | | | |
|---|---|---|---|
| EP | 0962642 | B1 | 6/2004 |
| EP | 1114244 | B1 | 10/2004 |

\* cited by examiner

METHOD AND DEVICE FOR ASCERTAINING A GAS-MASS FLOW IN A COMBUSTION ENGINE

CROSS REFERENCE

The present application claims the benefit under 35 U.S.C. § 119 of German Patent Application No. DE 102015225250.7 filed on Dec. 15, 2015, which is expressly incorporated herein by reference in its entirety.

FIELD

The present invention relates to combustion engines and in particular to methods for ascertaining a gas mass flow with the aid of a gas-mass meter. In addition, the present invention pertains to measures for correcting a pulsation error in the measurement of a gas-mass flow in a combustion engine.

BACKGROUND INFORMATION

An air-mass meter, which is developed as a hot-film air-mass meter, for instance, is usually provided for measuring a fresh-air mass flow in a combustion engine. Because of the cyclical operation of the combustion engine, however, the air supply takes place in an intermittent manner, so that pulsations impinge upon the actual gas flows in the combustion engine.

These pulsations in the gas-routing system of the combustion engine may have high amplitudes that lead to a corresponding periodic sensor signal. On account of the channel structure in the interior of the air-mass meter, however, the pulsations in the air routing that include a transmission error (mean value, phase and amplitude errors) are able to be measured by the sensor element. Since the sensor values of the measured air-mass flow are usually averaged, the actual mean value of the air-mass flow detected by the air-mass meter is falsified.

Various approaches for computationally correcting the error caused by the pulsation in the ascertainment of a gas-mass flow are available in the related art.

Methods for compensating a measuring error of a measuring signal representing an air-mass flow in a combustion engine are described in, for example, European and German Patent Applications EP 0962642 B1, DE 10 2009 056796 A1, EP 1114244 B1 and DE 19620435 C1.

SUMMARY

According to the present invention, a method for ascertaining an averaged gas-mass flow in a combustion engine, as well as a device and an engine system are provided.

Additional further developments are described herein.

According to a first aspect, a method is provided for ascertaining a mean value of a gas-mass flow in a combustion engine, the method having the following steps:
  Measuring a gas-mass flow impinged upon by a pulsation;
  Smoothing a sensor signal obtained by the measurement;
  Applying a correction quantity to the smoothed sensor signal;
  Ascertaining the correction quantity as a function of the operating state of the combustion engine with the aid of a data-based, non-parametric function model.

In accordance with the present invention, a correction of the pulsation error that results from the transmission behavior of the channel system is carried out, and also a correction of possible further errors is carried out using a correction quantity that is ascertained with the aid of a data-based parameter-free, i.e. non-parametric, function model.

Current correction functions for the correction of sensor signals for gas-mass flows are usually based on a 2D program map or a combination of a 2D program map and a 1D interpolation. These correction functions have a number of defined data points in a raster. To restrict the complexity, only maximally three input quantities are usually employed for ascertaining the correction quantity. An interpolation between the data points of the program maps subsequently takes place. In a physical correction on the basis of the input quantities of air-mass flow, pulsation frequency, pulsation amplitude and possibly the temperature, the pressure and the humidity of the aspirated fresh air, only a small section of the parameter space is actually able to be measured in a certain type of combustion engine, so that many data points lie in regions in which no values of the correction quantity are required or where they are polled during the operation of the combustion engine.

In contrast, the ascertainment of a correction quantity for a measured value of a gas-mass meter according to the above method is based on a data-based function model which is ascertained with the aid of a regression analysis on the basis of a Gaussian process model. This makes it possible to use a suitable hardware unit that specializes in the calculation of data-based function models for calculating the correction quantity, so that a rapid calculation of the respective value of the correction quantity is able to be carried out. Using a model-calculation unit as a separate hardware unit makes it possible to relieve the control unit of ascertaining the correction quantity.

Furthermore, because of the use of such a data-based (parameter-free) function model, it is possible to take a higher number of input quantities into account and to provide a function model that has been ascertained on the basis of a high number of previously measured data points. This allows for a clear increase in the precision of the correction of a measured gas-mass flow inasmuch as interpolation errors can be excluded.

In addition, the data-based, non-parametric function model may include a Gaussian process model or correspond to this model.

It may be provided that the correction quantity is applied to the smoothed sensor signal in an additive or multiplicative manner.

Furthermore, the data-based, non-parametric function model may have one or more of the following input quantities as input quantities:
  the smoothed sensor signal,
  a pulsation frequency that results from the engine speed and the number of cylinders of the combustion engine,
  a pulsation amplitude,
  one or more harmonic frequencies with regard to the pulsation frequency,
  an air temperature of the ambient air;
  an air pressure of the ambient air; and
  a humidity of the ambient air.

In particular, the data-based, non-parametric function model may be provided with at least three or more input quantities.

The gas-mass flow may correspond to an air-mass flow of fresh air supplied to the combustion engine.

The impinging of the smoothed sensor signal may be carried out in a main computer unit of an engine control device, the correction quantity being calculated in a separate model-calculation unit which is developed as a hardware unit.

Furthermore, the smoothing of the sensor signal may be realized by averaging the sensor signal, by forming the median of the sensor signal, by averaging local maxima of the sensor signal or by averaging local minima of the sensor signal.

According to one further aspect, a device, in particular an engine control device, is provided for ascertaining a mean value of a gas-mass flow in a combustion engine, the device being developed for:

measuring a gas-mass flow impinged upon by a pulsation;
smoothing a sensor signal obtained by the measurement;
applying a correction quantity to the smoothed sensor signal in order to obtain the mean value of the gas-mass flow; and
ascertaining the correction quantity as a function of the operating state of the combustion engine with the aid of a data-based, non-parametric function model.

According to a further aspect, an engine system is provided, which includes a combustion engine able to be operated in a cyclical operation, a gas-mass flow sensor, which is designed to provide a sensor signal for the gas-mass flow; and the above-described engine control device.

BRIEF DESCRIPTION OF THE DRAWINGS

Specific embodiments are explained in greater detail below with reference to the FIGURES.

DETAILED DESCRIPTION OF EXAMPLE EMBODIMENTS

Figure 1:
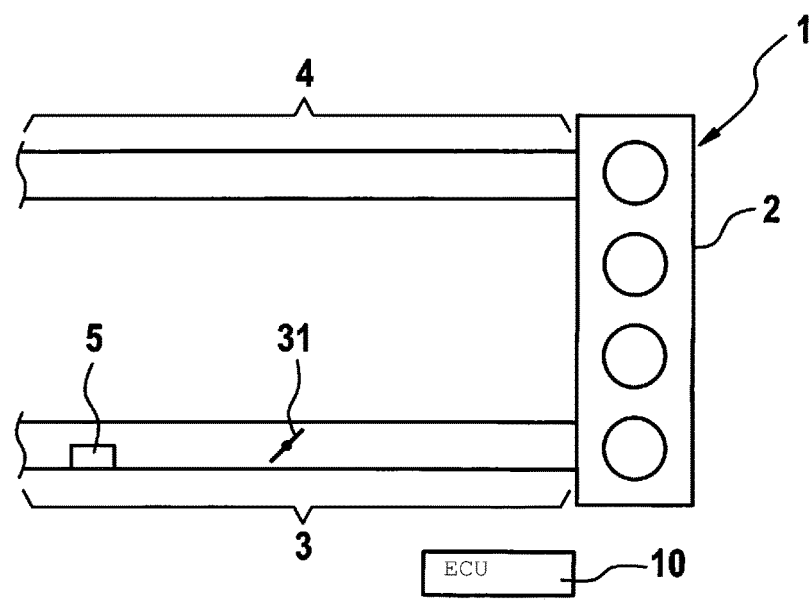
FIG. 1 shows a schematic illustration of an engine system having a combustion engine, a fresh-air mass sensor and an engine control device for ascertaining a fresh-air mass flow based on the sensor signal.

FIG. 1 schematically illustrates an engine system 1 which has a combustion engine 2. Combustion engine 2 is developed as a cyclically operated combustion engine and may be embodied as a four-stroke engine, such as a Diesel engine and an Otto engine, or as a two-stroke engine.

Via an air-supply system 3, fresh air is supplied to combustion engine 2. Fresh air flows into combustion engine 2 through air-supply system 3. A throttle valve 31 may be situated in air-supply system 3. Exhaust gases from the combustion are carried away from the combustion engine via an exhaust-gas system 4.

Combustion engine 2 may additionally be supercharged with the aid of a compressor (not shown).

The level of a gas-mass flow flowing in the gas-routing system made up of air-supply system 3 and exhaust-gas system 4 may be relevant for the operation of combustion engine 2. A gas-mass flow is usually measured with the aid of a gas-mass flow sensor 5 for this purpose. Gas-mass flow sensor 5 may be situated in a random location in air-supply system 3 or in exhaust-gas system 4.

In addition, the gas-routing system may be provided with a high-pressure exhaust-gas recirculation and/or a low-pressure exhaust-gas recirculation, which are/is operated in a conventional manner.

For example, in the case of an air-directed combustion engine such as the Otto engine, knowledge of the supplied air-mass flow is required. The fresh air aspirated by the combustion engine is routed past an air-mass flow sensor as one possible gas-mass flow sensor, which may be realized as a hot-film air-mass flow sensor, for example.

The operation of combustion engine 2 is controlled by an engine control device 10. Engine control device 10 operates combustion engine 2 in a conventional manner by actuating positioning sensors such as throttle valve 31, as a function of one or more specified quantities such as a driver-input torque or a driving pedal position, and as a function of operating states that are detected by suitable sensors. The gas-mass sensor represents one of the sensors for ascertaining the operating state.

Because of the cyclical operation of combustion engine 2, pulsations arise in the entire gas-routing system, i.e., in air-supply system 3 and in exhaust-gas system 4, due to the piston travel in the cylinders of combustion engine 2. However, because of the transmission behavior of gas-mass sensors in terms of fluid dynamics or the inertia, faulty sensor values of the gas-mass flow are usually ascertained. Gas-mass flow sensor 5 situated in air-supply system 3 determines the air mass flow.

A smoothed value of the air-mass flow, that is to say, a value from which fluctuations caused by the pulsations have been removed, may be calculated in engine-control device 10, the value being used as input quantity for a series of functions that are executed in engine-control device 10 for operating combustion engine 2. The smoothing of the sensor signal may be accomplished by arithmetic averaging of the sensor signal, for instance. If the sensor signal is supplied as an electric variable, the smoothing of the sensor signal may alternatively also be carried out with the aid of electrical or electronic components, such as a capacitor and/or a throttle coil, for example. Because of the transmission behavior in gas-mass flow sensor 5, the sensor value of the gas-mass flow is faulty after the smoothing in engine-control device 10. This pulsation error may amount to more than 20%.

Figure 2:
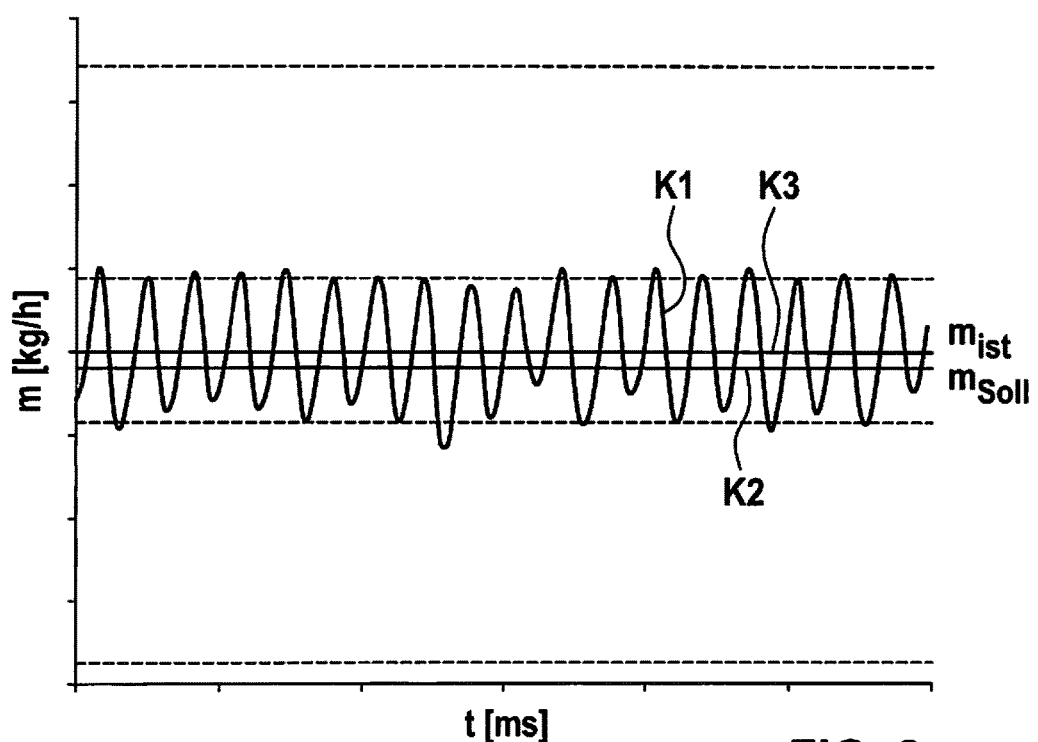
FIG. 2 shows a schematic illustration of a time characteristic of an actual fresh-air mass flow in a combustion engine as well as the characteristics of a sensor value measured by a hot-film air-mass sensor and an actual mean value of the fresh-air mass flow.

The characteristic of the sensor signal for the air-mass flow for an exemplary engine system is shown in FIG. 2 by way of example. Visible, as curve K1, is the characteristic of the air-mass flow, measured by gas-mass flow sensor 5, as a result of the pulsations in the gas-routing system during a static operation of the combustion engine. Curve K2 corresponds to the smoothed value of the air-mass flow. Curve K3 denotes the actual mean value of the air-mass flow. It can be seen that the smoothed value of the air-mass flow deviates considerably from the actual mean value of the air-mass flow. A correction quantity, which is able to be ascertained as a function of the operating point, is usually applied to the measured and subsequently smoothed value of the air-mass flow, and the value is thereby corrected in a suitable manner in order to obtain the actual mean value of the air-mass flow.

To ascertain the correction quantity, it is now provided to use a data-based, parameter-free function model, which may be set up in advance for a specific engine system.

The use of non-parametric, data-based function models is based on a Bayesian regression method. The bases of the Bayesian regression, for example, are described in C. E. Rasmussen et al., "Gaussian Processes for Machine Learning", MIT Press 2006. The Bayesian regression is a data-based method based on a model. The set-up of the model requires measuring points u of training data as well as associated output data of an output quantity to be modeled. The model is set up using data point data that fully or partially correspond to the training data or are generated from such. Furthermore, abstract hyperparameters are ascertained which parameterize the space of the model functions and effectively weight the influence of the individual measuring points of the training data on the later model prediction.

The abstract hyperparameters are ascertained by an optimization method. One possibility for such an optimization method consists of optimizing a marginal likelihood p(Y|H, X). The marginal likelihood p(Y|H,X) describes the plausibility of the measured y-values of the training data, represented as vector Y, given the model parameters H and the x-values (values of the input quantities) of the training data. In the model training, p(Y|H,X) is maximized by searching for suitable hyperparameters which lead to a characteristic of the model function determined by the hyperparameters and the training data and reproduce the training data as precisely as possible. To simplify the calculation, the logarithm of p(Y|H,X) is maximized since the logarithm does not change the consistency of the plausibility function.

The calculation of the Gaussian process model is carried out according to the following calculation rule. The input values for $\tilde{X}_d$ for a test point x (input quantity vector) are first standardized and centered, i.e. according to the following formula:

$$x_d = \frac{\tilde{x}_d - (m_x)_d}{(s_x)_d}$$

Here, mx corresponds to the mean value function with regard to a mean value of the input values of the data point data, $s_x$ corresponds to the variance of the input values of the data point data, and d corresponds to the index for the dimension D of test point x.

The following is obtained as the result of the set-up of the non-parametric, data-based function model:

$$v = \sum_{i=1}^{N} (Q_y)_i \sigma_f \exp\left(-\frac{1}{2}\sum_{d=1}^{D} \frac{(x_{i,d} - x_d)^2}{l_d}\right).$$

Model value v ascertained in this way is standardized with the aid of an output standardization, i.e. according to the formula:

$$\tilde{v} = v s_y + m_y.$$

v corresponds to a standardized model value (output value) at a standardized test point x (input quantity vector of dimension D), $\tilde{v}$ corresponds to a (non-standardized) model value (output value) at a (non-standardized) test point $\tilde{u}$ (input quantity vector of dimension D), $x_i$ to a data point of the data point data, N to the number of data points of the data point data, D to the dimension of the input data/training data/data point data space, and $l_d$ and $\tilde{X}_d$ to the hyperparameters from the model training. Vector $Q_y$ is a quantity calculated from the hyperparameters and the training data. Furthermore, $m_y$ corresponds to the mean value function with regard to a mean value of the output values of the data point data, and $s_y$ corresponds to the variance of the output values of the data point data.

Setting up the function model may be realized with the aid of a test stand or the like. Here, different operating points of the engine system are adjusted and the characteristic of the actual air-mass flow, impinged upon by the pulsations, is measured. The ascertainment of the exact air-mass flow may be carried out with the aid of a reference air-mass sensor. The corresponding mean value $m_{soll}$ of the air-mass flow is ascertained computationally from the measured values.

Furthermore, corresponding value $m_{ist}$ of the air-mass flow is measured using the reference-air-mass sensor. A multitude of measuring points result, each being defined by a measured operating point and an allocated relation between mean value $m_{soll}$ of the air-mass flow and the averaged value of the air-mass flow, and representing the training data for the training of the Gaussian process model. The relation specifies the type of impingement of value $m_{ist}$, measured during an active operation, of the smoothed air-mass flow by the correction quantity. The training of the data-based function model takes place on the basis of the training data in order to obtain the hyperparameters of the data-based function model.

When employing a data-based function model, a virtually random number of input quantities may be used for ascertaining the correction quantity. For example, the measured air-mass flow, the pulsation frequency resulting from the engine speed and the number of cylinders of the combustion engine, and the pulsation amplitude may be specified as input quantities for the data-based function model, via which the operating state of the combustion engine is determined. The pulsation amplitude, for instance, may correspond to one half of the difference between the maximum and minimum value of the measured air-mass flow, the RMS, the variance of the measured values within a certain monitoring time period or, when using an FFT analysis, it may correspond directly to the contribution of the main frequency. Further input quantities may be harmonic frequencies with respect to the pulsation frequency, their respective amplitudes, which are able to ascertained from a corresponding FFT analysis. The FFT analysis is carried out during the active operation across a fixed time period. Additional input quantities may be the air temperature of the ambient air, the air pressure of the ambient air and the atmospheric humidity.

Figure 3:
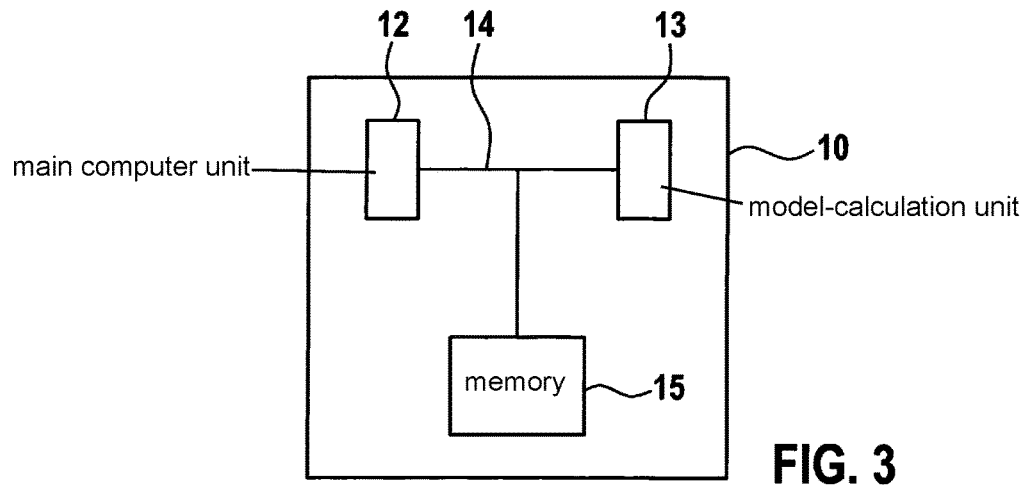
FIG. 3 shows a schematic illustration of an engine control device of the engine system of FIG. 1.

FIG. 3 schematically illustrates the structure of an engine control device 10, in particular for operating combustion engine 2. Engine control device 10 includes as main computer unit 12 a microcontroller, which is developed in integrated form with a model-calculation unit 13. Model-calculation unit 13 is essentially the hardware unit which is able to carry out hardware-based function calculations, especially those for the aforementioned Bayesian regression method. More specifically, model-calculation unit 13 is developed to carry out exponential-function operations and addition and multiplication operations in loop calculations.

Calculations in model-calculation unit 13 are started by main computer unit 12 in order to ascertain a function value for a test point based on hyperparameters and data point data describing the function model. The hyperparameters and data point data are stored in a memory unit 15 also integrated into main computer unit 12 and model-calculation unit 13, and are used for representing a data-based function model for calculating the correction quantity.

Through an internal communications connection, in particular a system bus 14, main computer unit 12 and model-calculation unit 13 are connected to each other for communication purposes. Furthermore, a memory unit 15 and a DMA unit 6 (DMA=direct memory access) may be connected to the internal communications connection in order to ensure a signal communication with main computer unit 12 and model-calculation unit 13.

In principle, model-calculation unit 13 includes only hardware (hardwiring), which specifies a defined calculation sequence, and is preferably not designed to execute software code. For this reason, it is also not necessary to provide a processor in model-calculation unit 13. This allows for a resource-optimized realization of such a model-calculation unit 13. Because of the calculation according to an implemented hardware routine, the calculation time is able to be considerably shortened in comparison with a software algorithm.

Figure 4:
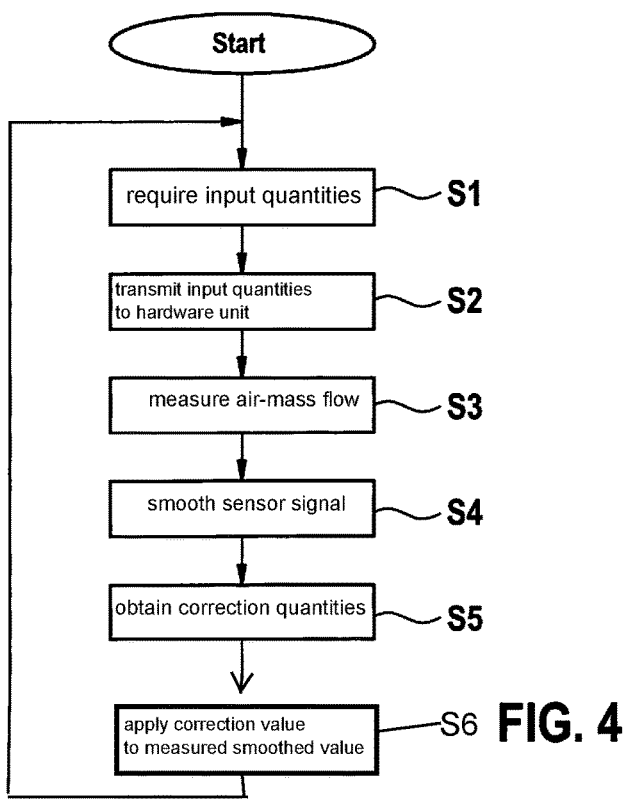
FIG. 4 shows a flow diagram for illustrating a method for ascertaining a fresh-air mass flow from a sensor value of an air-mass sensor.

The flow diagram of FIG. 4 schematically illustrates the sequence for ascertaining the correction quantity.

In step S1, the respective input quantities required for the data-based function model are acquired to begin with.

In step S2, these input quantities are transmitted to a hardware unit which is designed specifically for calculating a data-based function model.

In step S3, the air-mass flow is then measured in order to obtain a sensor signal.

This sensor signal has a dynamic characteristic which is based on the pulsations in the gas-routing system. The sensor signal is computationally smoothed in step S4, in particular averaged. As an alternative, the smoothing of the sensor signal may also be accomplished by forming the median of the sensor signal, by averaging local maxima of the sensor signal or by averaging local minima of the sensor signal.

In step S5, the value of the correction quantities allocated to the input quantities by the hardware unit is obtained, and in step S6, this correction quantity is applied to the measured, smoothed value of the air-mass flow in order to obtain the corrected mean value of the air-mass flow.

The method is executed in a cyclical manner in order to always provide the current mean value of the air-mass flow to engine control device 10.

What is claimed is:

1. A method for controlling a combustion engine using a determined mean value of a gas-mass flow in the combustion engine, the method comprising:
    measuring a gas-mass flow impinged upon by a pulsation, the pulsation resulting from piston travel in cylinders of the combustion engine;
    smoothing a sensor signal obtained by the measurement;
    ascertaining a correction quantity using a data-based, non-parametric function model, the data-based, non-parametric function model including a Gaussian process model, the Gaussian process model having, as input quantities, (i) a frequency of the pulsation, (ii) the smoothed sensor signal, and (iii) an amplitude of the pulsation;
    applying the correction quantity to the smoothed sensor signal to determine the mean value of the gas-mass flow; and
    operating the combustion engine using the determined mean value of the gas-mass flow.

2. The method as recited in claim 1, wherein the correction quantity is applied to the smoothed sensor signal in an additive or multiplicative manner.

3. The method as recited in claim 1, wherein the input quantities further include at least one of the following:
    or more harmonic frequency(ies) with respect to the pulsation frequency,
    an air temperature of ambient air,
    an air pressure of ambient air, and
    a humidity of the ambient air.

4. The method as recited in claim 1, wherein the gas-mass flow is an air-mass flow of fresh air supplied to the combustion engine.

5. The method as recited in claim 1, wherein the application of the smoothed sensor signal is carried out in a main computer unit of an engine control device, the correction quantity being calculated in a separate model-calculation unit which is a hardware unit.

6. The method as recited in claim 1, wherein the smoothing of the sensor signal is performed one of by averaging the sensor signal, by forming the median, by averaging local maxima or by averaging local minima.

7. A engine control device for controlling a combustion engine using a determined mean value of a gas-mass flow in the combustion engine, the device being designed to:
    measure a gas-mass flow impinged upon by a pulsation, the pulsation resulting from piston travel in cylinders of the combustion engine;
    smooth a sensor signal obtained by the measurement;
    ascertain a correction quantity using a data-based, non-parametric function model, the data-based, non-parametric function model including a Gaussian process model, the Gaussian process model having, as input quantities, (i) a frequency of the pulsation, (ii) the smoothed sensor signal, and (iii) an amplitude of the pulsation;
    apply the correction quantity to the smoothed sensor signal to determine the mean value of the gas-mass flow;
    ;and
    operate the combustion engine using the determined mean value of the gas-mass flow.

8. An engine system, comprising:
    a combustion engine operable in a cyclical operation;
    a gas-mass flow sensor which is designed to supply a sensor signal for the gas-mass flow; and
    an engine control device for controlling the combustion engine using a determined mean value of a gas-mass flow in the combustion engine, the device being designed to (i) measure a gas-mass flow impinged upon by a pulsation, the pulsating resulting from piston travel in cylinders of the combustion engine, (ii) smooth a sensor signal obtained by the measurement, (iii) ascertain a correction quantity using a data-based, non-parametric function model, the data-based, non-parametric function model including a Gaussian process model, the Gaussian process model having, as input quantities, (a) a frequency of the pulsation, (b) the smoothed sensor signal, and (b) an amplitude of the pulsation, (iv) apply the correction quantity to the smoothed sensor signal to determine the mean value of the gas-mass flow, and (v) operate the combustion engine using the determined mean value of the gas-mass flow.

9. A non-transitory machine-readable memory medium on which is stored a computer program for controlling a combustion engine using a determined mean value of a gas-mass flow in the combustion engine, the computer program, when executed by a control unit, causing the control unit to perform:
    measuring a gas-mass flow impinged upon by a pulsation, the pulsation resulting from piston travel in cylinders of the combustion engine;
    smoothing a sensor signal obtained by the measurement;

ascertaining a correction quantity using a data-based, non-parametric function model, the data-based, non-parametric function model including a Gaussian process model, the Gaussian process model having, as input quantities, (i) a frequency of the pulsation, (ii) the smoothed sensor signal, and (iii) an amplitude of the pulsation;

applying the correction quantity to the smoothed sensor signal to determine the mean value of the gas-mass flow; and operating the combustion engine using the determined mean value of the gas-mass flow.

10. The method as recited in claim 1, wherein the operating of the combustion engine using the determined mean value of the gas-mass flow includes actuating a throttle valve of the combustion engine as a function of the determined mean value of the gas-mass flow.

11. The engine control device as recited in claim 7, wherein the device is designed to actuate a throttle valve of the combustion engine as a function of the determined mean value of the gas-mass flow.

12. The engine system as recited in claim 8, wherein the engine control device is designed to actuate a throttle valve of the combustion engine as a function of the determined mean value of the gas-mass flow.

13. The non-transitory machine-readable memory medium as recited in claim 9, wherein the operating of the combustion engine using the determined mean value of the gas-mass flow includes actuating a throttle valve of the combustion engine as a function of the determined mean value of the gas-mass flow.

14. The method as recited in claim 1, wherein the amplitude of the pulsation is one half of a different between a maximum value of the measured gas-mass flow and a minimum value of the measured gas-mass flow.

* * * * *